US010603652B2

(12) United States Patent
Tokunaga et al.

(10) Patent No.: US 10,603,652 B2
(45) Date of Patent: Mar. 31, 2020

(54) SILVER-CARRYING ZEOLITE MOLDED ARTICLE (71) Applicant: TOSOH CORPORATION, Yamaguchi (JP)

(72) Inventors: Keisuke Tokunaga, Yamaguchi (JP); Shigeru Hirano, Yamaguchi (JP); Yoju Shimizu, Yamaguchi (JP); Hajime Funakoshi, Yamaguchi (JP)

(73) Assignee: TOSOH CORPORATION, Yamaguchi (JP)

( * ) Notice: Subject to any disclaimer, the term of this patent is extended or adjusted under 35 U.S.C. 154(b) by 0 days.

(21) Appl. No.: 16/078,902

(22) PCT Filed: Feb. 23, 2017

(86) PCT No.: PCT/JP2017/006787
§ 371 (c)(1),
(2) Date: Aug. 22, 2018

(87) PCT Pub. No.: WO2017/146137
PCT Pub. Date: Aug. 31, 2017

(65) Prior Publication Data
US 2019/0046950 A1 Feb. 14, 2019

(30) Foreign Application Priority Data
Feb. 26, 2016 (JP) ................. 2016-035659

(51) Int. Cl.
B01J 20/28 (2006.01)
B01J 20/18 (2006.01)
C01B 39/22 (2006.01)
B01J 20/30 (2006.01)
B01J 29/12 (2006.01)
B01J 35/10 (2006.01)
B01J 35/02 (2006.01)
B01J 37/30 (2006.01)

(52) U.S. Cl.
CPC ............ *B01J 20/18* (2013.01); *B01J 20/186* (2013.01); *B01J 20/28* (2013.01); *B01J 20/2804* (2013.01); *B01J 20/2804* (2013.01); *B01J 20/28016* (2013.01); *B01J 20/28064* (2013.01); *B01J 20/30* (2013.01); *B01J 20/3085* (2013.01); *B01J 29/12* (2013.01); *B01J 35/023* (2013.01); *B01J 35/1023* (2013.01); *B01J 37/30* (2013.01); *C01B 39/22* (2013.01); *B01J 2229/20* (2013.01)

(58) Field of Classification Search
CPC . B01J 20/18; B01J 20/28; B01J 20/186; B01J 20/30; B01J 20/3085; B01J 20/2804; B01J 20/28016; B01J 20/28064; B01J 29/12; B01J 2229/20; B01J 35/023; B01J 35/1023; B01J 37/30; B01J 20/28004; C01B 39/22
USPC ........ 502/60, 79, 64, 69, 400, 407, 411, 414
See application file for complete search history.

(56) References Cited

U.S. PATENT DOCUMENTS

| 3,658,467 | A | 4/1972 | Maeck |
| 4,913,850 | A | 4/1990 | Puppe et al. |
| 6,572,838 | B1 | 6/2003 | Sebastian et al. |
| 7,455,718 | B2 | 11/2008 | Ackley et al. |
| 7,662,213 | B2 | 2/2010 | Ackley et al. |
| 8,221,718 | B2 | 7/2012 | Ackley et al. |
| 2004/0167013 | A1* | 8/2004 | Ou .................. B01J 23/002 502/64 |
| 2016/0247588 | A1 | 8/2016 | Kobayashi et al. |

FOREIGN PATENT DOCUMENTS

| JP | 3-295805 | 12/1991 |
| JP | 10-87322 | 4/1998 |
| JP | 10-101326 | 4/1998 |
| JP | 11-50069 | 2/1999 |
| JP | 2003-2636 | 1/2003 |
| JP | 2003-20489 | 1/2003 |
| JP | 2003-275582 | 9/2003 |
| JP | 2006-281068 | 10/2006 |
| JP | 2008-544849 | 12/2008 |
| JP | 5504368 | 3/2014 |

OTHER PUBLICATIONS

International Search Report in International Patent Application No. PCT/JP2017/006787, dated Apr. 25, 2017.
International Preliminary Report on Patentability in International Patent Application No. PCT/JP2017/006787, dated Aug. 28, 2018.
European Search Report for European Application No. EP17756575. 1, dated Sep. 12, 2019.

* cited by examiner

Primary Examiner — Elizabeth D Wood
(74) Attorney, Agent, or Firm — Greenblum & Bernstein, P.L.C.

(57) ABSTRACT

Provided are: a silver-carrying zeolite molded article in which aggregation of silver is inhibited and which has excellent capability of dispersing silver, when compared to conventional silver-carrying zeolite molded articles; and a method for producing the silver-carrying zeolite molded article. In the silver-carrying zeolite molded article, the molar ratio of $Si/Al_2$ is 2.0-3.0, the molar ratio of (alkali metal+Ag)/Al is 0.9-1.1, the total amount of $SiO_2$, $Al_2O_3$, $Ag_2O$, and alkali metal oxides is 90 wt % or more, the contained amount of silver ions is 5 wt % or more, and only a single type of zeolite is contained. The molded article can be produced by subjecting a zeolite molded article having zeolite purity of 90% or more to an ion exchange treatment using a silver-containing aqueous solution.

9 Claims, 4 Drawing Sheets

SILVER-CARRYING ZEOLITE MOLDED ARTICLE

TECHNICAL FIELD

The present invention relates to a zeolite molded article and an adsorbent using the same.

BACKGROUND ART

Zeolites have excellent adsorption characteristics, and for this reason, are used as adsorbents after ion exchange with various metal ions. From an industrial point of view, the zeolites used as adsorbents are used in the form of a zeolite molded article. The zeolite molded article is obtained by mixing a zeolite powder and a clay binder and then calcining the mixture.

Among various ion exchange zeolite molded articles, zeolite molded articles carrying silver by ion exchange have high adsorption characteristics. Accordingly, silver-containing zeolite molded articles are widely used as various adsorbents (for example, those disclosed in Patent Literatures 1 to 4).

Patent Literatures 1 and 2 describe methods of using silver ion-exchanged zeolite molded articles to remove moisture and sulfur compounds in gases. Here, the silver ion-exchanged zeolite molded article is prepared by subjecting a cylindrical zeolite molded article having a length of about 3 to 4 mm to silver ion exchange.

Patent Literature 3 describes a method of using a bead-like Ag-containing X type zeolite molded article having a diameter of 1.4 to 1.5 mm, to remove carbon monoxide, ethylene, propylene, and the like in air.

Patent Literature 4 discloses a zeolite molded article which obtained by granulating an X type zeolite powder that has been ion-exchanged with silver, to remove radioactive iodine contained in steam.

Patent Literature 5 discloses a method of treating an exhaust gas containing iodine or organic iodine using a silver-carrying zeolite molded article containing two types of zeolites, i.e., an X type zeolite and an A type zeolite, and containing no binder.

CITATION LIST

Patent Literature

Patent Literature 1: JPH11-50069
Patent Literature 2: JP2003-020489
Patent Literature 3: JP2008-544849
Patent Literature 4: JP5504368
Patent Literature 5: U.S. Pat. No. 4,913,850

SUMMARY OF INVENTION

Technical Problem

While the zeolite molded article containing silver exhibits high adsorption characteristics, it is expensive because it contains silver, which is a precious metal. Furthermore, when the silver-containing zeolite molded articles described in Patent Literatures 1 to 4 are produced, silver aggregates during their production. Aggregated silver does not contribute to adsorption. The aggregated silver causes a decrease in the specific surface area of the zeolite and pore clogging, so that the adsorption characteristics of the silver-containing zeolite remarkably deteriorate. Such a problem becomes remarkable particularly when zeolite is used in the form of a molded article. Further, the zeolite molded article described in Patent Literature 5 is inferior in dispersibility of silver.

In view of the foregoing problems, it is an object of the present invention to provide a silver-carrying zeolite molded article and a method of producing the same, in which aggregation of silver is inhibited as compared with conventional silver-carrying zeolite molded articles, and which is further excellent in dispersibility of silver.

Solution to Problem

The present inventors have investigated in detail the behavior of silver when performing the silver carrying treatment on the zeolite molded article. As a result, the present inventors have found that carrying silver on the zeolite molded article progresses unevenly. In addition, the present inventors have found that by controlling the purity and state of the zeolite molded article, the silver carrying treatment proceeds uniformly and the silver is highly dispersed.

Specifically, the present invention provides the following [1] to [8].

[1] A silver-carrying zeolite molded article wherein a molar ratio of $Si/Al_2$ is 2.0 or more and 3.0 or less, a molar ratio of (alkali metal+Ag)/Al is 0.9 or more and 1.1 or less, a total amount of $SiO_2$, $Al_2O_3$, $Ag_2O$, and an alkali metal oxide is 90% by weight or more, and a silver ion is contained in an amount of 5% by weight or more, and it contains a single type of zeolite.

[2] The silver-carrying zeolite molded article according to [1] described above, wherein the alkali metal is sodium.

[3] The silver-carrying zeolite molded article according to [1] or [2] described above, wherein a BET specific surface area is 560 $m^2/g$ or greater and 900 $m^2/g$ or smaller.

[4] The silver-carrying zeolite molded article according to any one of [1] to [3] described above, wherein the zeolite molded article has a FAU type crystalline structure.

[5] The silver-carrying zeolite molded article according to any one of [1] to [4] described above, wherein a silver content is less than 36% by weight.

[6] The silver-carrying zeolite molded article according to any one of [1] to [5] described above, wherein the zeolite molded article has a zeolite fine particle having an average particle size of 0.2 μm or greater and 1.5 μm or smaller on a surface of a zeolite powder.

[7] A production method of the silver-carrying zeolite molded article according to any one of [1] to [6] described above, including an ion exchange step of subjecting a zeolite molded article having a zeolite purity of 90% or more to an ion exchange treatment with a silver-containing aqueous solution.

[8] The production method according to [7] described above, including a drying step of drying the zeolite molded article after the ion exchange treatment step at 100° C. or lower.

Advantageous Effects of Invention

The present invention can provide a zeolite molded article and a method of producing the same, in which aggregation of silver is inhibited as compared with conventional silver-carrying zeolite molded articles, and which is further excellent in dispersibility of silver.

The molded article of the present invention can have excellent adsorption characteristics expected as various adsorbents such as gases and ions.

DESCRIPTION OF EMBODIMENTS

Hereinafter, a description will be given of a silver-carrying zeolite molded article of the present invention.

The silver-carrying zeolite molded article of the present invention (hereinafter also referred to as "molded article of the present invention") is a zeolite molded article that has been allowed to carry silver. As a result, the molded article of the present invention has high adsorption characteristics. Here, the zeolite molded article refers to those in which zeolite is solidified to have a certain shape. Therefore, any size and shape suitable for handleability of the molded article when used in various adsorbent applications may be adopted.

The ratio of 1 mol of silicon (Si) to 2 mol of aluminum (Al) (hereinafter referred to as "$Si/Al_2$ molar ratio") of the molded article of the present invention is 2.0 or more and 3.0 or less. As a result, the number of sites of Al, which are coordination points of silver ions, is moderately present, whereby silver is highly dispersed. The $Si/Al_2$ molar ratio is preferably 2.2 or more, further preferably 2.4 or more, and still further preferably 2.6 or more. This further inhibits the aggregation of silver. Furthermore, the $Si/Al_2$ molar ratio is 3.0 or less. As a result, the number of Al sites is more increased, whereby silver is more highly dispersed.

The molded article of the present invention preferably contains an alkali metal. By subjecting the molded article to ion exchange with an alkali metal, silver ions are more uniformly dispersed. Here, the alkali metal is at least one type selected from the group consisting of lithium (Li), sodium (Na), potassium (K), rubidium (Rb), and cesium (Cs). The molded article of the present invention preferably contains Na.

The molar ratio of the total of the alkali metal and silver to Al (hereinafter referred to as the "molar ratio of (alkali metal+Ag)/Al") of the molded article of the present invention is 0.9 or more and 1.1 or less.

The total amount of $SiO_2$, $Al_2O_3$, $Ag_2O$, and an alkali metal oxide of the molded article of the present invention is 90% by weight or more, preferably 95% by weight or more, further preferably 97% by weight or more, and more preferably 98% by weight or more. As a result, a zeolite molded article in which there are few components by which silver tends to aggregate other than zeolite and silver is highly dispersed is provided. Here, Ag and alkali metal in the molded article of the present invention are expressed in terms of oxides, and can be expressed, for example, as a weight ratio in a state of being heated at 900° C.

The BET specific surface area of the molded article of the present invention is preferably 560 m²/g or greater, further preferably 600 m²/g or greater, and still further preferably 700 m²/g or greater. This can cause the surface of the molded article of the present invention and the adsorbate to be efficiently in contact with each other, and the molded article to have high adsorption characteristics. The BET specific surface area of the molded article of the present invention is usually 900 m²/g or smaller, preferably 850 m²/g or smaller, and further preferably 750 m²/g or smaller. The BET specific surface area of the molded article of the present invention is preferably 600 m²/g or greater and 900 m²/g or smaller, further preferably 700 m²/g or greater and 850 m²/g or smaller, and still further preferably 700 m²/g or greater and 750 m²/g or smaller. This can increase the ratio of silver ions to the total amount of silver to be carried, whereby silver acts efficiently on adsorption.

The crystal structure of the molded article of the present invention is preferably at least any of an A type zeolite and a FAU type zeolite, and further preferably a FAU type zeolite. Since the FAU type zeolite has a large pore diameter such as 8 Å or greater and 15 Å or smaller, aggregation of silver is further inhibited. As the FAU type zeolite, an X type zeolite and a Y type zeolite can be mentioned. The crystal structure of the zeolite molded article of the present invention can be confirmed by powder X-ray diffraction measurement.

The molded article of the present invention includes not only a zeolite powder but also a zeolite converted from an inorganic binder. That is, the molded article contains zeolite fine particles, which will be described later.

The zeolite powder may have any particle size as long as it has an average particle size larger than that of the zeolite fine particles described later. The average particle size of the zeolite powder is preferably 2 μm or greater and 8 μm or smaller, and further preferably 3 μm or greater and 6 μm or smaller. This can enhance the strength of the molded article of the present invention.

Here, the average particle size of the zeolite powder can be determined on the basis of an average size of 30 or more independent particles which can be confirmed in a scanning electron microscope observation view with a measurement magnification of 1,500 to 3,000 and are selected randomly.

The molded article of the present invention has a zeolite purity, before carrying silver, of 90% or more, preferably 95% or more, and further preferably 97% or more. Here, the zeolite purity can be calculated by a general moisture adsorption amount measurement. Specifically, the zeolite purity can be calculated using the following formula (1) by the ratio of the amount of moisture adsorbed per 100 g of the zeolite molded article before carrying silver to the amount of moisture adsorbed per 100 g of the zeolite powder.

Zeolite Purity=(Moisture Adsorption Amount of Zeolite Molded Article before Carrying Silver)/(Moisture Adsorption Amount of Zeolite Powder)×100  (1)

For example, the zeolite purity of the molded article containing the X type zeolite powder can be calculated using the following formula (2).

Zeolite Purity=(Water Adsorption Amount of X type Zeolite Molded Article before Carrying Silver)/(Water Adsorption Amount of X type Zeolite Powder)×100  (2)

A zeolite molded article having such a high zeolite purity can be obtained by converting an inorganic binder in the molded article into a zeolite. That is, the molded article of the present invention contains an inorganic binder converted into a zeolite. Usually, when an inorganic binder is converted into a zeolite, zeolite fine particles described later are formed and present on the surface of the zeolite powder. Since the zeolite fine particles function as a binder that binds the zeolite powders to each other, the mechanical strength of the molded article of the present invention is increased. That is, the strength of a molded article containing no zeolite fine particles and having a zeolite purity of less than 90% is substantially low. Normally, the zeolite molded article is obtained by molding a mixture of the zeolite powder and the inorganic binder. However, when the zeolite powder is mixed in an amount of 90% by weight or more, the plasticity necessary for molding cannot be obtained, and it becomes extremely difficult to obtain a molded article having a certain shape. Therefore, it is preferable that the molded article of the present invention contain zeolite powder and zeolite fine particles.

The zeolite fine particles preferably have an average particle size of 0.2 μm or greater and 1.5 μm or smaller.

Here, the average particle size of the zeolite fine particles can be determined on the basis of an average size of 30 or more independent particles of minimum units with a particle diameter of 1.5 μm or smaller which can be confirmed in a scanning electron microscope observation view with a measurement magnification of 10,000 to 15,000 and are selected randomly.

It can be confirmed from the scanning electron microscope observation view that the zeolite powder has zeolite fine particles on the surface thereof. That is, the fact that the zeolite powder has the zeolite fine powder on the surface thereof can be qualitatively confirmed by the scanning electron microscope observation view.

It can also be confirmed from the volume distribution particle size that the zeolite powder has zeolite fine particles on the surface thereof. That is, the volume distribution particle size measured in the pulverized state of the molded article of the present invention has a monomodal particle size distribution peak, and the volume average particle size (D50) thereof is approximately the same as that of the zeolite powder. That is, there is no peak in the particle size distribution corresponding to the average particle size of the zeolite fine particles. Accordingly, it can be confirmed that the zeolite powder and the zeolite fine particles are integrated with each other and the zeolite powder has the zeolite fine particles on the surface thereof.

Note that such a zeolite molded article having a high zeolite purity can also be confirmed by XRD. That is, in the obtained XRD pattern, only diffraction peaks attributable to the zeolite structure are confirmed. When the zeolite purity is not satisfied and the zeolite contains a large amount of impurities, for example, an inorganic binder, a diffraction peak derived from the inorganic binder may be observed. Furthermore, as in Example 1 and Example 3, no impurities other than the specific zeolite were confirmed. This reveals that each specific zeolite (Example 1: X type zeolite, Example 3: A type zeolite) includes a single type thereof. When this zeolite is a single type, the dispersibility of silver is excellent.

In the molded article of the present invention, the zeolite fine particles also act as a binder. Therefore, the molded article of the present invention is excellent in mechanical strength. The pressure resistance of the molded article of the present invention is usually 15 N or more, preferably 30 N or more, and further preferably 40 N or more for a cylindrical molded article having a diameter of 1.5 mm and an average length of 5 mm, for example.

The main states of silver in the molded article of the present invention (hereinafter also referred to as "silver species") are silver ions, silver clusters, and metallic silver. Silver ions are silver in the dispersed state, while silver clusters and metallic silver are silver in the aggregated state.

Among these silver species, silver ions contribute to adsorption characteristics, whereas silver clusters and metallic silver do not contribute to adsorption characteristics of the zeolite molded article. Therefore, the ratio of the total of the silver cluster and the metallic silver relative to the amount of silver carried in the molded article of the present invention is 70% or less, further preferably 50% or less, and still further preferably 45% or less. Since higher adsorption characteristics can be expected, the ratio of the total of the silver cluster and the metallic silver relative to the amount of silver carried in the molded article of the present invention is preferably 43% or less, and further preferably 34% or less.

The molded article of the present invention preferably contains a large amount of silver ions, and the content of silver ions is 5% by weight or more, preferably 8% by weight or more, and further preferably 11% by weight or more. The more the amount of silver ions, the higher adsorption characteristics are expected, but if the absolute amount is increased, the production costs become too high. In view of this, it is preferable that the amount of silver ions be less than 36% by weight. The amount of silver ions is preferably 30% by weight or less, further preferably 26% by weight or less, still further preferably 25% by weight or less, more preferably 19% by weight or less, and particularly preferably 14% by weight or less. From the viewpoint of production costs and adsorption characteristics, the content of silver ions is preferably 8% by weight or more and 25% by weight or less, and further preferably 11% by weight or more and 25% by weight or less. The molded article of the present invention contains metallic silver or silver clusters which are aggregated silver. Since they clog the pores of the zeolite to reduce the adsorption performance, the contents thereof are preferably as low as possible.

The content of the silver clusters of the molded article of the present invention is preferably 22% by weight or less, further preferably 12% by weight or less, still further preferably 11% by weight or less, more preferably 8.5% by weight or less, and particularly preferably 7% by weight or less.

The content of the metallic silver of the molded article of the present invention is preferably 2.5% by weight or less, further preferably 1.4% by weight or less, still further preferably 1.1% by weight or less, more preferably 1.0% by weight or less, and particularly preferably 0.8% by weight or less.

Here, the contents of various silver species are represented by the following formula (3).

Content of Each of Silver Species=Proportion of Each of Silver Species×Amount of Carried Silver (3)

For example, the content of the silver ions is represented by the following formula (4).

Content of Silver Ions=Proportion of Silver Ions× Amount of Carried Silver (4)

In the present invention, the proportion of each of silver species can be determined by UV-VIS measurement. That is, the UV-VIS pattern of the molded article of the present invention is separated by waveforms. In the UV-VIS pattern after waveform separation, a peak having a peak top in a wavelength range of 210 nm or more and 240 nm or less is assigned as a peak of silver ion, a peak having a peak top in a wavelength range of more than 240 nm and 350 nm or less is assigned as a peak of silver cluster, and a peak having a peak top in a wavelength range of more than 350 nm and 700 nm or less is assigned as a peak of metallic silver. The ratio of silver contained in each of the silver ion, silver cluster, and metallic silver can be determined from the peak area of each peak obtained.

The amount of silver carried on the molded article of the present invention is higher than the content of the silver ions and is preferably 50% by weight or less. In general, it is said that the adsorption characteristics become higher as the amount of carried silver increases. However, when the amount of carried silver is more than 50% by weight, aggregation of silver becomes noticeable, and the amount of metallic silver and silver clusters, which are aggregated silver, in particular, metallic silver become large. The metallic silver not only clogs the pores of the zeolite, but also tends to be detached from the zeolite molded article, so that the resulting zeolite molded article has low adsorption characteristics per unit silver amount. In addition, when the amount of carried silver is more than 50% by weight, production costs become too high, limiting the industrial applications. Since silver in the molded article of the present invention efficiently contributes to adsorption characteristics, it is preferable that the amount of carried silver be 46% by weight or less. The amount of carried silver is preferably 36% by weight or less, further preferably 35.5% by weight or less, still further preferably 35% by weight or less, more preferably 32% by weight or less, particularly preferably 30% by weight or less, further more preferably 25% by weight or less, and more preferably 20% by weight or less. It is preferable that the amount of carried silver in the molded article of the present invention be 5% by weight or more. The amount of carried silver is preferably 8% by weight or more, further preferably 11% by weight or more, and still further preferably 16% by weight or more. As a result, the content of silver ions is increased, and a molded article having excellent adsorption characteristics can be obtained.

The shape of the molded article of the present invention is preferably at least one type selected from the group consisting of a disk shape, a cylinder shape, a hollow shape, a polyhedron shape, a sphere shape, a substantially sphere shape, a three-leaf shape, and a massive shape. The shape is further preferably at least one type selected from the group consisting of a cylinder shape, a sphere shape, and a three-leaf shape, and particularly preferably a cylinder shape.

The size of the molded article of the present invention is preferably 0.1 mm or greater and 5.0 mm or smaller, further preferably 0.1 mm or greater and 4.0 mm or smaller, and still further preferably 0.1 mm or greater and 2.0 mm or smaller, in terms of an average diameter.

The molded article of the present invention can be used as an adsorbent. At this time, the molded article of the present invention may be used solely as an adsorbent, or may be mixed with an adsorbent of an optional component and used as an adsorbent.

Next, a method of producing the molded article of the present invention will be described.

The molded article of the present invention can be obtained by a production method including an ion exchange treatment step of subjecting the zeolite molded article having a zeolite purity of 90% or more, preferably a zeolite purity of 95% or more to an ion exchange treatment with an aqueous solution containing silver.

The ion exchange treatment step is performed such that the zeolite molded article having a zeolite purity of 90% or more, preferably a zeolite purity of 95% or more, is treated with an aqueous solution containing silver. As a result, aggregation of silver is inhibited, and a zeolite molded article in which silver is highly dispersed can be obtained.

Here, when a molded article formed only of zeolite powder by, for example, tablet molding is subjected to the ion exchange treatment step, since the strength thereof is remarkably low, the molded article is crushed and collapsed. Thus, the molded article of the present invention cannot be obtained.

The molded article to be subjected to the ion exchange treatment step has the zeolite purity of 90% or more, and preferably the zeolite purity of 95% or more. As a result, the silver carried on the obtained molded article becomes more highly dispersed.

The zeolite molded article having the zeolite purity of 90% or more, preferably the zeolite purity of 95% or more, can preferably be obtained by a production method that additionally includes a step of subjecting the zeolite molded article to an alkali treatment.

Here, the alkali treatment is to treat the zeolite molded article with an alkali aqueous solution.

The zeolite purity of the zeolite molded article to be subjected to the alkali treatment is 95% by weight or more, and further preferably 97% by weight or more.

The alkali aqueous solution used for the alkali treatment is preferably at least one type selected from the group consisting of a sodium hydroxide aqueous solution, a potassium hydroxide aqueous solution, and a lithium hydroxide aqueous solution, and further preferably sodium hydroxide. Sodium hydroxide is available at low cost.

The alkali concentration of the alkali aqueous solution is arbitrarily set. From the viewpoint of zeolite conversion efficiency and production costs, it is preferable that the alkali concentration of the alkali aqueous solution be 1% by weight or more and 30% by weight or less. The alkali concentration is preferably 3% by weight or more and 20% by weight or less, and further preferably 5% by weight or more and 12% by weight or less.

The alkali aqueous solution preferably contains $SiO_2$ as necessary. The $SiO_2$ concentration of the alkali aqueous solution is preferably 0.5% by weight or more and 5% by weight or less, and further preferably 0.5% by weight or more and 2% by weight or less.

The conditions of the alkali treatment include bringing the zeolite molded article into contact with an alkali aqueous solution and treating the zeolite molded article at 40° C. or higher and 100° C. or lower for 3 hours or longer. As a result, the inorganic binder contained in the zeolite molded article is sufficiently converted into the zeolite.

The silver-containing aqueous solution to be supplied to the ion exchange treatment step may be any aqueous solution containing a silver compound. The silver compound is preferably at least one selected from the group consisting of silver nitrate, silver sulfate, silver acetate, and silver chloride, and is further preferably silver nitrate. Silver nitrate is available at low cost.

The silver concentration of the silver-containing aqueous solution is arbitrarily set. From the viewpoint of ion exchange efficiency and production costs, the silver concentration of the silver-containing aqueous solution is preferably 0.1% by weight or more and 30% by weight or less in terms of silver nitrate.

The treatment method is arbitrarily selected so long as silver is carried on the zeolite molded article. Examples thereof may include a method of stirring the zeolite molded article in a silver-containing aqueous solution so that the zeolite molded article is not crushed, and a method of circulating the silver-containing aqueous solution through the zeolite molded article packed in a column.

In order to allow the zeolite molded article to efficiently carry silver, the treatment temperature is preferably 30° C. or higher and 90° C. or lower. For the same reason, the weight ratio of the silver-containing aqueous solution to the zeolite molded article is preferably 3 or more and 10 or less.

The molded article of the present invention obtained in the alkali treatment step may be crushed in order to adjust the molded article to have an arbitrary size.

The zeolite molded article to be subjected to the alkali treatment step can be obtained by a production method including a mixing step of mixing the zeolite powder with the inorganic binder, a molding step of molding the mixture, and a calcining step of calcining the molded article.

In the mixing step, it is preferable to mix the zeolite powder and the inorganic binder to obtain a mixture. The weight ratio of the mixture is set such that the weight of the inorganic binder is preferably 50 parts by weight or less, further preferably 30 parts by weight or less, and still further preferably 20 parts by weight or less, relative to 100 parts by weight of the zeolite powder. As a result, the obtained silver-carrying zeolite molded article has sufficient strength. The inorganic binder is usually contained in an amount of 10 parts by weight or more.

It is preferable that the inorganic binder be a clay mineral. The inorganic binder is preferably at least one clay mineral selected from the group consisting of kaolin, attapulgite, sepiolite, and montmorillonite, and is further preferably kaolin. As a result, the inorganic binder is more efficiently converted into the zeolite in the alkali treatment step described above.

In the mixing step, a granulation aid may be included in addition to the zeolite powder and the inorganic binder in order to improve the granulating property. Examples of the granulation aid may include methylcellulose, and carboxymethylcellulose may be mentioned as a particularly preferred methylcellulose. Water may be added as necessary.

In the molding step, it is preferable to mold the mixture using at least one arbitrary molding method selected from the group consisting of rolling granulation, fluidized bed granulation, stirring granulation, compression granulation, extrusion granulation, crushing granulation, and spray granulation.

After the molding step, a molded article drying step may be included in which moisture of the molded article is removed. The drying temperature in the molded article drying step may be 100° C. or higher as an example.

In the calcining step, it is preferable to perform the treatment at 500° C. or higher in an arbitrary atmosphere.

The production method of the present invention preferably includes a drying step of drying the zeolite molded article, after the ion exchange treatment, at 100° C. or lower. As a result, it is possible to remove moisture in the molded article while remarkably inhibiting aggregation of silver in the production of the molded article of the present invention, that is, the formation of silver clusters and metallic silver. In the production method of the present invention, drying is performed preferably at 95° C. or lower, and further preferably at 90° C. or lower. In the production method of the present invention, drying is performed preferably at 45° C. or higher, preferably at 50° C. or higher, and further preferably at 60° C. or higher. As a result, moisture in the pores of the molded article can be efficiently removed while aggregation of silver is inhibited.

The conditions that promote drying may easily promote aggregation of silver. Therefore, it is preferable that the atmosphere in the drying step be not a pressurized atmosphere, an oxygen atmosphere, or a vacuum atmosphere, but the drying step is performed in the air atmosphere.

EXAMPLES

The present invention will now be described specifically by way of examples. However, the present invention is not limited by the examples.
(Measurement of Water Adsorption Amount)

As a pretreatment, the zeolite powder or the zeolite molded article (hereinafter, simply referred to as "sample") was dried at 110° C. in the air to sufficiently remove moisture. After the pretreatment, the sample was left to stand in a desiccator for 16 hours or longer under the conditions of a temperature of 25° C. and a relative humidity of 80%, and subjected to a hydration treatment for saturating and adsorbing moisture. The weight (X1) of the sample after the hydration treatment was measured. Further, the sample after the hydration treatment was subjected to a heat treatment under the condition of 900° C. in the air for 1 hour to sufficiently remove moisture. The sample weight (X2) after the heat treatment was measured. Using the values of X1 and X2, the water adsorption amount per 100 g of the sample (hereinafter referred to as "g/100 g-agent") was determined by the following formula (5).

$$\text{Water Adsorption Amount}(g/100 \text{ g-agent}) = (X1-X2)/X2 \times 100 \quad (5)$$

The zeolite purity was calculated by substituting the moisture adsorption amount obtained by the expression (5) into the formula (1).
(BET Specific Surface Area)

The BET specific surface area was measured using a common BET specific surface area measuring device (device name: BELSORP 28SA, manufactured by Microtrac Bell Corporation). The adsorption isotherm was measured at the liquid nitrogen temperature ($-196°$ C.) as the adsorption temperature. The BET specific surface area was calculated from the nitrogen adsorption volume in the range corresponding to the relative pressure of 0 to 0.1 in the obtained adsorption isotherm.

The measurement sample was pulverized to an aggregation diameter of 0.5 mm to 1 mm, sized, and then heated at 350° C. for 2 hours under vacuum, as pretreatment.
(Measurement of Amount of Carried Silver, and Composition)

The molded article sample was dissolved in an acid to prepare a measurement solution. The concentration of metal ions in the measurement solution was measured by the ICP method. Measurement was performed using a common ICP-AES (device name: OPTIMA3000DV, manufactured by PERKIN-ELMER).

The respective concentrations of silicon, aluminum, an alkali metal, and silver of the measurement sample were determined. The contents of the obtained silicon, aluminum, alkali metal, and silver were measured, and the $Si/Al_2$ molar ratio, $Na/Al$ molar ratio, and $Ag/Al$ molar ratio in the sample were determined. Silicon, aluminum, alkaline metal, and silver were converted in terms of their oxides to obtain a total amount, and the sum total (% by weight) of $SiO_2$, $Al_2O_3$, $Na_2O$, and $Ag_2O$ was determined on the basis of the total amount. Also, the amount of carried silver was determined on the basis of the silver concentrations.
(Proportions of Silver Species)

The state of silver in the molded article (silver species) was measured by ultraviolet-visible light measurement. That is, ultraviolet-visible absorption was measured under the following conditions using a self-recorded spectrophotometer (device name: UV-3100, manufactured by Shimadzu Corporation) in which an integrating sphere attachment device (device name: ISR-3100, manufactured by Shimadzu Corporation) was attached to the sample chamber.

Measurement Conditions: Diffuse Reflection Method
Scan speed: 200 nm/min
Slit width: 5.0 nm
Baseline correction: barium sulfate powder
Measurement range of wavelength: 210 to 700 nm The resulting UV-VIS pattern was separated into waveforms. In the UV-VIS pattern after waveform separation, a peak having a peak top in a wavelength range of 210 nm or more and 240 nm or less was assigned as a peak of silver ion, a peak having a peak top in a wavelength range of more than 240 nm and 350 nm or less was assigned as a peak of silver cluster, and a peak having a peak top in a wavelength range of more than 350 nm and 700 nm or less was assigned as a peak of metallic silver. The proportion of silver contained in silver ions (Ag(ion)), silver clusters (Ag(clus)), and metallic silver (Ag(metal)) was determined from the peak areas of the respective peaks obtained.
(Content of Silver Species)

The content of each of silver species in the measurement sample was determined from the amount of carried silver obtained by the ICP measurement and the proportion of each of silver species obtained by the UV-VIS measurement.
(Particle Size)

Thirty independent particles of minimum units with a particle diameter of 1.5 µm or smaller, which can be confirmed in a scanning electron microscope observation view observed with a magnification of 10,000, were randomly extracted, the size thereof was measured, and the average size thereof was determined as the average particle size of the zeolite fine particles.

In addition, 30 independent particles, which can be confirmed in the scanning electron microscope observation view observed with a magnification of 2,000, were randomly extracted, the size thereof was measured, and the average size thereof was determined as the average particle size of the zeolite powder.
(Measurement of Particle Size Distribution)

After 5 g of the molded article was pulverized in a mortar for 10 minutes, the pulverized sample was allowed to pass through a sieve having an opening of 200 µm. After 0.5 g of the pulverized sample having passed through the sieve was added to 50 ml of pure water to form a slurry, ultrasonic dispersion was performed for 2 minutes with a homogenizer. After that, the particle size distribution of the slurry solution was measured by a micro track (manufactured by Nikkiso Co., Ltd.).

Example 1

20 Parts by weight of kaolin clay and 3 parts by weight of carboxymethylcellulose were kneaded into 100 parts by weight of an X type zeolite powder (trade name: F-9, manufactured by Tosoh Corporation) while adding water, to obtain a mixture. The water content of the resulting mixture was 45% by weight.

The mixture was molded by extrusion molding to obtain a cylindrical molded article having a diameter of 1.5 mm. The molded article was dried at 100° C. overnight and then calcined at 600° C. for 3 hours under air flow.

The calcined molded article was washed with pure water that was at room temperature. After washing, an aqueous solution containing NaOH (8.1% by weight) and $SiO_2$ (1% by weight) was circulated through the molded article at a flow rate of 235 mL/min. The circulating flow was performed at 40° C. for 1 hour and then at 90° C. for 7 hours to convert the kaolin clay to zeolite. The $Si/Al_2$ molar ratio of the resulting X type zeolite molded article was 2.8.

Figure 8:
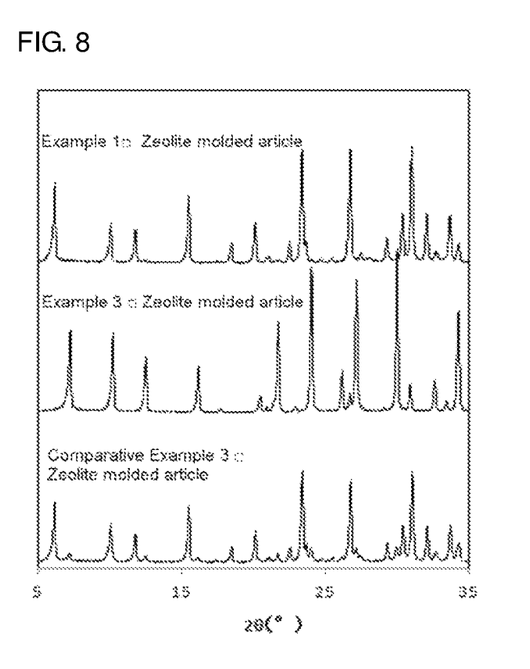
FIG. 8 is an XRD diffraction diagram of the zeolite molded articles of Example 1, Example 3, and Comparative Example 3.

The moisture adsorption amount of the X type zeolite powder was 35.0 (g/100 g-agent), and the moisture adsorption amount of the X type zeolite molded article was 34.2 (g/100 g-agent). Thus, the zeolite purity was 97.7%. XRD measurements confirmed that the resulting zeolite contained no other zeolite structures than the X type zeolite (thus containing a single type of the X type zeolite). The XRD diffraction diagram is shown in FIG. 8.

14.0 Grams of silver nitrate was dissolved in 142 g of pure water to prepare a silver nitrate aqueous solution of 8.9% by weight. 40 Grams of the cylindrical X type zeolite molded articles having a diameter of 1.5 mm and a length of 1 to 5 mm was immersed in the aqueous solution, whereby ion exchange treatment was performed.

The ion exchange treatment was performed at 50° C. for 4 hours. The stirring was performed in the vicinity of the liquid surface of the silver nitrate aqueous solution at a stirring speed of 100 rpm. During the ion exchange treatment, the flow of the molded article due to stirring could not be confirmed.

After the ion exchange treatment, the product was washed with sufficient amount of pure water and dried at 90° C. for 12 hours to obtain a molded article of this example.

Figure 1:
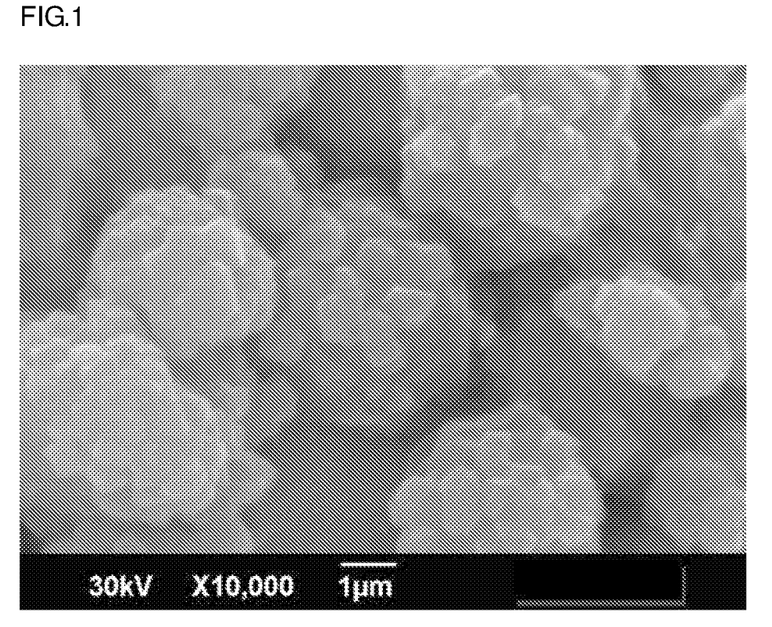
FIG. 1 is a SEM observation view (magnification: 10,000) of a zeolite molded article of Example 1.
Figure 2:
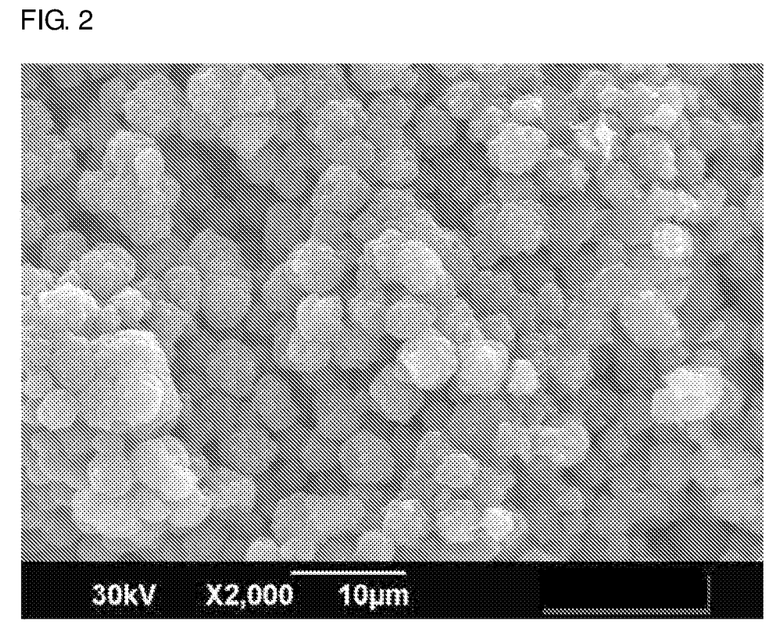
FIG. 2 is a SEM observation view (magnification: 2,000) of the zeolite molded article of Example 1.
Figure 3:
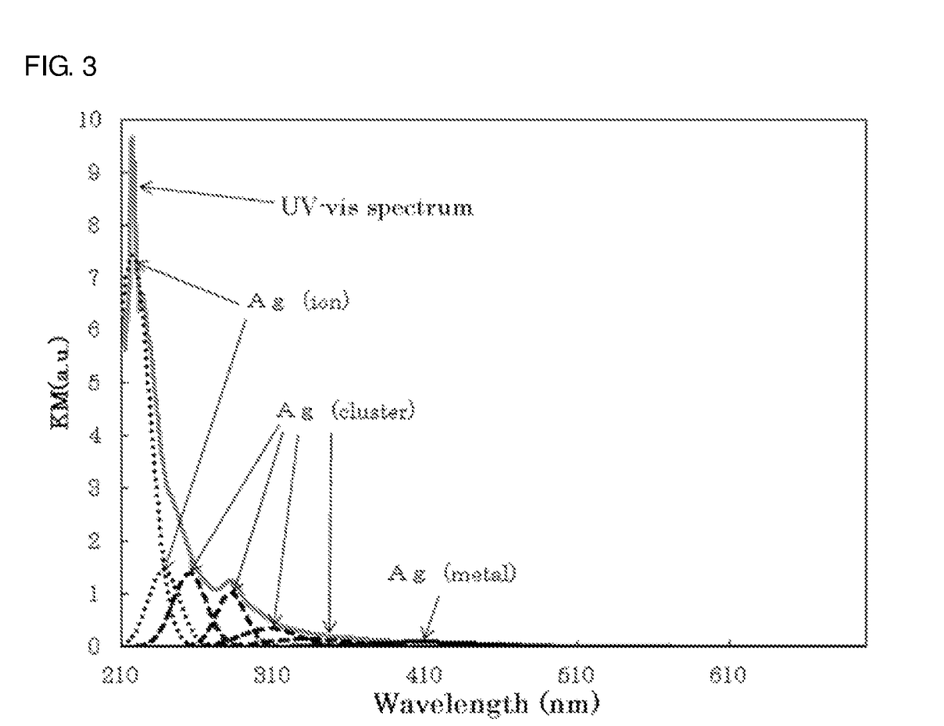
FIG. 3 shows the results of UV-VIS measurement of the zeolite molded article of Example 1 and the results of waveform separation.

FIGS. 1 and 2 show SEM observation views of the molded article of this example. As can be seen from FIG. 1, it was confirmed that the X type zeolite fine particles were present on the surface of the X type zeolite powder. The average particle size of the zeolite fine particles in the molded article was 0.64 µm. Further, the average particle size of the zeolite powder in the molded article was determined from FIG. 2, and as a result, the average particle size was 4.4 µm. In addition, impurities other than the X type zeolite were not confirmed in the molded article (thus, the molded article contained a single type of the X type zeolite). FIG. 3 shows the result of UV-VIS measurement of the molded article of the present embodiment and the results of waveform separation. The evaluation results of the molded article of this example are shown in Tables 1, 2 and 3.

The molded article of this example was pulverized in a mortar to have an aggregation diameter of 0.1 to 15 µm, and then the volume distribution particle size thereof was measured. As a result, the particle size distribution was monomodal, and the volume average particle size (D50) was 3.7 µm. As a result, it was confirmed that zeolite fine particles were present on the surface of the zeolite powder in the molded article of this example.

Comparative Example 1

A molded article of this comparative example was obtained in the same manner as that in Example 1 except that a commercially available X type zeolite molded article (trade name: molecular sieve 13X manufactured by Kishida Chemical Co., Ltd., $Si/Al_2$ molar ratio=3.3) was used. The moisture adsorption amount of the commercially available X type zeolite molded article was 29.5 (g/100 g-agent), and thus, the zeolite purity thereof was 84.3% by weight.

Figure 4:
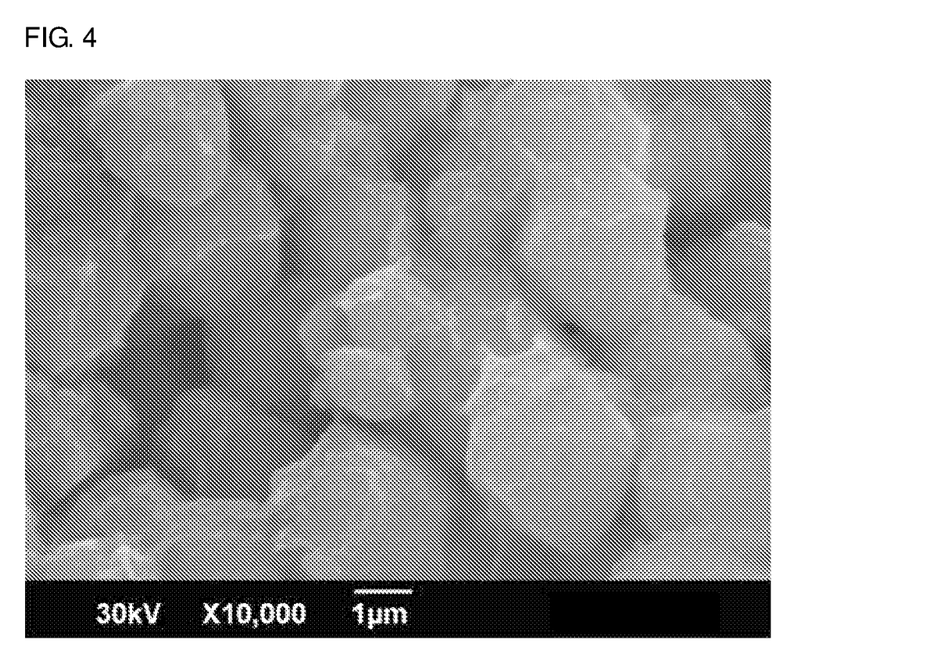
FIG. 4 is a SEM observation view (magnification: 10,000) of a zeolite molded article of Comparative Example 1.
Figure 5:
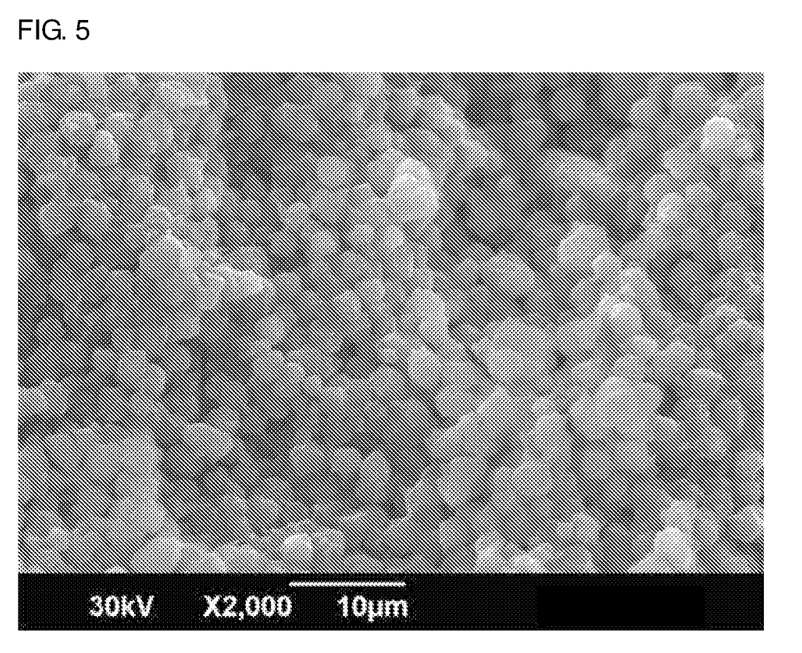
FIG. 5 is a SEM observation view (magnification: 2,000) of the zeolite molded article of Comparative Example 1.

FIGS. 4 and 5 show SEM observation views of the molded article of this comparative example. In FIG. 4, X type zeolite fine particles were not observed, and it was confirmed that a filamentous clay binder was present on the surface of the zeolite powder. Further, the average particle size of the X type zeolite powder in the molded article was determined from FIG. 5, and was 2.5 μm. The evaluation results of the molded article of this comparative example are shown in Tables 1, 2, and 3.

TABLE 1

|  | BET specific surface area (m²/g) | Zeolite purity (%) | Si/Al$_2$ Molar ratio | Na/Al Molar ratio | Ag/Al Molar ratio |
| --- | --- | --- | --- | --- | --- |
| Example 1 | 725 | 97.7 | 2.8 | 0.66 | 0.34 |
| Comparative Example 1 | 554 | 84.3 | 3.3 | 0.55 | 0.45 |

TABLE 2

|  | (Alkali metal + Ag)/Al | Ag-carrying amount (wt %) | Total amount of SiO$_2$, Al$_2$O$_3$, Na$_2$O, and Ag$_2$O (wt %) |
| --- | --- | --- | --- |
| Example 1 | 1.0 | 18 | 98 |
| Comparative Example 1 | 1.0 | 18 | 95 |

TABLE 3

|  | Ag (ion) | | Ag (clus) | | Ag (metal) | |
| --- | --- | --- | --- | --- | --- | --- |
|  | Proportion (%) | Wt % | Proportion (%) | Wt % | Proportion (%) | Wt % |
| Example 1 | 67 | 12.1 | 30 | 5.4 | 3 | 0.5 |
| Comparative Example 1 | 57 | 10.3 | 38 | 6.8 | 5 | 0.9 |

In spite of the molded articles having the same amount of carried silver, it was confirmed that the molded article of the example contained more silver ions than the zeolite molded article of the comparative example by 10% or more, and the aggregation of silver was inhibited. In addition, the zeolite molded article of the comparative example had a particularly large number of silver clusters as compared with the molded article of the example.

Example 2

A molded article of this example was obtained in the same manner as that in Example 1 except that 29.9 g of silver nitrate was dissolved in 142 g of pure water to prepare a silver nitrate aqueous solution of 17.4% by weight. The evaluation results of the molded article of this example are shown in Tables 4, 5, and 6.

Comparative Example 2

A molded article of this example was obtained in the same manner as that in Comparative Example 1 except that 32.5 g of silver nitrate was dissolved in 142 g of pure water to prepare a silver nitrate aqueous solution of 18.6% by weight. The evaluation results of the molded article of this comparative example are shown in Tables 4, 5, and 6.

TABLE 4

|  | BET specific surface area (m²/g) | Zeolite purity (%) | Si/Al$_2$ Molar ratio | Na/Al Molar ratio | Ag/Al Molar ratio |
| --- | --- | --- | --- | --- | --- |
| Example 2 | 570 | 97.7 | 2.8 | 0.27 | 0.73 |
| Comparative Example 2 | 439 | 84.3 | 3.3 | 0.22 | 0.78 |

TABLE 5

|  | (Alkali metal + Ag)/Al | Ag-carrying amount (wt %) | Total amount of SiO$_2$, Al$_2$O$_3$, Na$_2$O, and Ag$_2$O (wt %) |
| --- | --- | --- | --- |
| Example 2 | 1.0 | 34 | 99 |
| Comparative Example 2 | 1.0 | 34 | 96 |

TABLE 6

|  | Ag (ion) | | Ag (clus) | | Ag (metal) | |
| --- | --- | --- | --- | --- | --- | --- |
|  | Proportion (%) | Wt % | Proportion (%) | Wt % | Proportion (%) | Wt % |
| Example 2 | 75 | 25.5 | 23 | 7.8 | 2 | 0.7 |
| Comparative Example 2 | 66 | 22.4 | 30 | 10.2 | 4 | 1.4 |

As can be seen from Table 6, it was found that in the molded article of this example, the ratio of silver ions increases as the amount of carried silver increases. Further, compared with the molded article of Example 1, the molded article of Example 2 had the same content of metallic silver, whereas in the zeolite molded article of the comparative example, the content of metallic silver increased remarkably as the carried silver increased.

Example 3

20 Parts by weight of kaolin clay and 3 parts by weight of carboxymethylcellulose were kneaded into 100 parts by weight of an A type zeolite powder (trade name: A-4, manufactured by Tosoh Corporation) while adding water, to obtain a mixture. The water content of the resulting mixture was 45% by weight.

The mixture was extruded to obtain a plurality of cylindrical zeolite molded articles having a diameter of 1.5 mm and a length of 1 to 5 mm. The molded article was dried at 100° C. overnight and then calcined at 600° C. for 3 hours under air flow.

The calcined molded article was washed with pure water that was at room temperature. After washing, an aqueous solution containing NaOH (6% by weight) was circulated through the molded article at a flow rate of 235 mL/min. The circulating flow was performed at 40° C. for 1 hour and then at 80° C. for 5 hours to convert the kaolin clay to zeolite. The Si/Al$_2$ molar ratio of the resulting A type zeolite molded article was 2.5.

The moisture adsorption amount of the A type zeolite powder was 27.0 (g/100 g-agent), and the moisture adsorption amount of the A type zeolite molded article was 26.5 (g/100 g-agent). Thus, the zeolite purity was 98.1%. XRD measurements confirmed that the resulting zeolite contained no other zeolite structures than the type A zeolite (thus containing a single type of the A type zeolite). The XRD diffraction diagram is shown in FIG. 8.

25.0 Grams of silver nitrate was dissolved in 142 g of pure water to prepare a silver nitrate aqueous solution of 15.0% by weight. 40 Grams of the cylindrical A type zeolite molded articles having a diameter of 1.5 mm and a length of 1 to 5 mm was immersed in the aqueous solution, whereby ion exchange treatment was performed.

The ion exchange treatment was performed at 50° C. for 4 hours. The stirring was performed in the vicinity of the liquid surface of the silver nitrate aqueous solution at a stirring speed of 100 rpm. During the ion exchange treatment, the flow of the molded article due to stirring could not be confirmed.

After the ion exchange treatment, the product was washed with sufficient amount of pure water and dried at 90° C. for 12 hours to obtain a molded article of this example.

Figure 6:
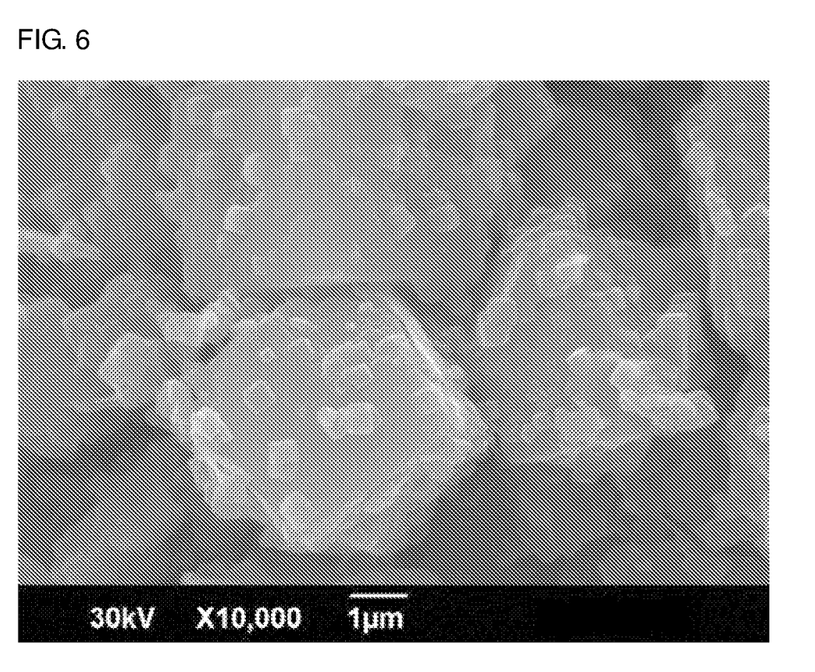
FIG. 6 is a SEM observation view (magnification: 10,000) of a zeolite molded article of Example 3.
Figure 7:
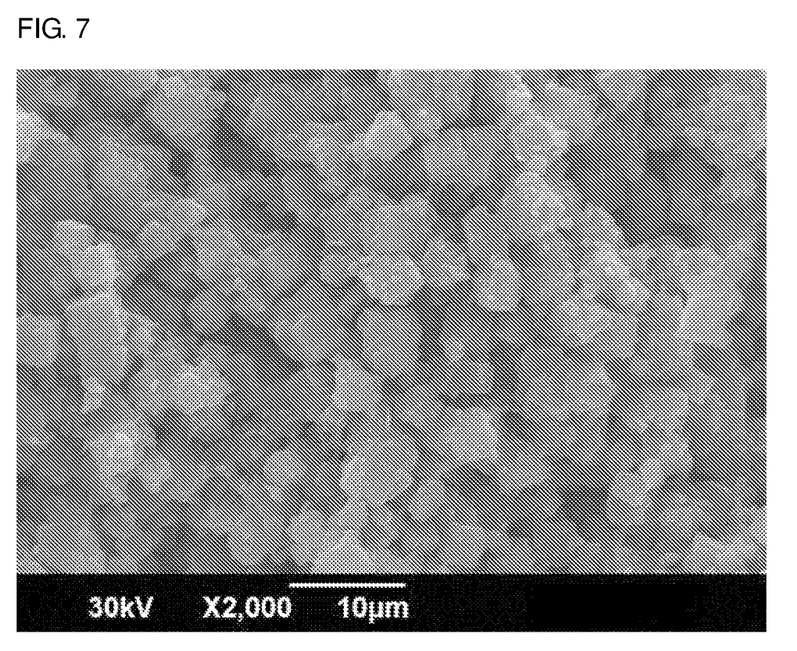
FIG. 7 is a SEM observation view (magnification: 2,000) of the zeolite molded article of Example 3.

FIGS. 6 and 7 show SEM observation views of the molded article of this example. As can be seen from FIG. 6, it was confirmed that the A type zeolite fine particles were present on the surface of the A type zeolite powder. The average particle size of the zeolite fine particles in the molded article was 0.39 μm. Further, the average particle size of the zeolite powder in the molded article was determined from FIG. 7, and as a result, the average particle size was 4.2 μm. In addition, impurities other than the A type zeolite were not confirmed in the molded article (thus, the molded article contained a single type of the A type zeolite). The evaluation results of the molded article of this example are shown in Tables 7, 8 and 9.

Example 4

A molded article of this example was obtained in the same manner as that in Example 3 except that 30.7 g of silver nitrate was dissolved in 142 g of pure water to prepare a silver nitrate aqueous solution of 17.8% by weight. The evaluation results of the molded article of this example are shown in Tables 7, 8, and 9.

TABLE 7

|  | Zeolite purity (%) | Si/Al$_2$ Molar ratio | Na/Al Molar ratio | Ag/Al Molar ratio |
|---|---|---|---|---|
| Example 3 | 98.1 | 2.5 | 0.42 | 0.58 |
| Example 4 | 98.1 | 2.5 | 0.29 | 0.71 |

TABLE 8

|  | (Alkali metal + Ag)/Al | Ag-carrying amount (wt %) | Total amount of SiO$_2$, Al$_2$O$_3$, Na$_2$O, and Ag$_2$O (wt %) |
|---|---|---|---|
| Example 3 | 1.0 | 30 | 99 |
| Example 4 | 1.0 | 35 | 99 |

TABLE 9

|  | Ag (ion) | | Ag (clus) | | Ag (metal) | |
|---|---|---|---|---|---|---|
|  | Proportion (%) | Wt % | Proportion (%) | Wt % | Proportion (%) | Wt % |
| Example 3 | 33 | 9.9 | 61 | 18.3 | 6 | 1.8 |
| Example 4 | 34 | 11.9 | 60 | 21.0 | 6 | 2.1 |

Comparative Example 3

The calcined molded article was washed with pure water that was at room temperature. After washing, an aqueous solution containing NaOH (6% by weight) was circulated through the molded article at a flow rate of 235 mL/min. A zeolite molded article was obtained in the same manner as that in Example 1 except that the circulating flow was performed at 40° C. for 1 hour, and then at 80° C. for 5 hours to convert the kaolin clay to an A type zeolite.

From the analysis result of the XRD diffraction diagram, it was confirmed that the X type zeolite and the A type zeolite were included. The XRD diffraction diagram is shown in FIG. 8.

The moisture adsorption amount of the zeolite molded article containing the X type zeolite and the A type zeolite was 33.4 (g/100 g-agent). From the result of Example 1, the moisture adsorption amount of the X type zeolite molded article was 34.2 (g/100 g-agent), and from the result of Example 3, the moisture adsorption amount of the A type zeolite molded article was 26.5 (g/100 g-agent). Therefore, it was confirmed that this zeolite molded article was a molded article containing 89.6% of the X type zeolite molded article and 10.4% of the A type zeolite molded article (in terms of ratio).

A molded article of this comparative example was obtained by performing ion exchange treatment of silver in the same manner as that in Example 1 except that 29.9 g of silver nitrate was dissolved in 142 g of pure water to prepare a silver nitrate aqueous solution of 17.4% by weight. The evaluation results of the molded articles of this comparative example are shown in Tables 10 and 11.

TABLE 10

|  | (Alkali metal + Ag)/Al | Ag-carrying amount (wt %) | Total amount of SiO$_2$, Al$_2$O$_3$, Na$_2$O, and Ag$_2$O (wt %) |
|---|---|---|---|
| Comparative Example 3 | 1.0 | 34 | 99 |

TABLE 11

|  | Ag (ion) | | Ag (clus) | | Ag (metal) | |
|---|---|---|---|---|---|---|
|  | Proportion (%) | Wt % | Proportion (%) | Wt % | Proportion (%) | Wt % |
| Comparative Example 3 | 19 | 6.5 | 74 | 25.2 | 7 | 2.4 |

As can be seen from Tables 6, 9, and 11, it was found that the molded article of Comparative Example 3 was inferior in dispersibility of silver to the X type zeolite molded article of Example 2 and the A type zeolite molded article of Example 4 in which the amount of carried silver was equivalent. It is considered that, when two different types of zeolites are mixed, silver is preferentially adsorbed to zeolite species which are easy to exchange silver, so that silver aggregates.

The entire contents of the specification, claims, drawings, and abstract of Japanese Patent Application No. 2016-35659 filed on Feb. 26, 2016 are cited herein and incorporated as disclosure of the specification of the present invention.

INDUSTRIAL APPLICABILITY

The silver-carrying zeolite molded article according to the present invention can be used as an adsorbent. Furthermore, the silver-carrying zeolite molded article according to the present invention can be used as catalysts, antibacterial agents, and other known zeolite molded article applications.

The invention claimed is:

1. A silver-carrying zeolite molded article comprising:
   zeolite powders; and
   zeolite particles;
   wherein a molar ratio of $Si/Al_2$ is 2.0 or more and 3.0 or less, a molar ratio of (alkali metal+Ag)/Al is 0.9 or more and 1.1 or less, a total amount of $SiO_2$, $Al_2O_3$, $Ag_2O$, and an alkali metal oxide is 90% by weight or more, and a silver ion is contained in an amount of 5% by weight or more, and the molded article contains a single type of zeolite.

2. The silver-carrying zeolite molded article according to claim 1, wherein the alkali metal is sodium.

3. The silver-carrying zeolite molded article according to claim 1, wherein a BET specific surface area is 560 $m^2/g$ or greater and 900 $m^2/g$ or smaller.

4. The silver-carrying zeolite molded article according to claim 1, wherein the zeolite molded article has a FAU type crystalline structure.

5. The silver-carrying zeolite molded article according to claim 1, wherein a silver content is less than 36% by weight.

6. The silver-carrying zeolite molded article according to claim 1, wherein the zeolite molded article has the zeolite particles having an average particle size of 0.2 μm or greater and 1.5 μm or smaller on surfaces of the zeolite powders.

7. A production method of the silver-carrying zeolite molded article according to claim 1, comprising:
   subjecting a zeolite molded article having a zeolite purity of 90% or more to an ion exchange treatment with a silver-containing aqueous solution; and
   drying the zeolite molded article after the ion exchange treatment at 45° C. or higher and 95° C. of lower.

8. The silver-carrying zeolite molded article according to claim 1, wherein a concentration of the silver ion in the zeolite molded article is 5% by weight or more and less than 36% by weight.

9. The silver-carrying zeolite molded article according to claim 1, wherein an amount of carried silver in the zeolite molded article is 5% by weight or more and 46% by weight or less.

* * * * *